(12) United States Patent
Riach et al.

(10) Patent No.: US 6,739,926 B2
(45) Date of Patent: May 25, 2004

(54) DAMPING OF CONDUCTOR TUBES

(75) Inventors: Michael Gordon Riach, Cumbria (GB); Brian James Crawford, Laurencekirk (GB); Peter Findlay Cranston, Stonehaven (GB)

(73) Assignees: Amec Services, Ltd., Aberdeen (GB); Fumantite International Ltd., Cumbria (GB)

( * ) Notice: Subject to any disclaimer, the term of this patent is extended or adjusted under 35 U.S.C. 154(b) by 0 days.

(21) Appl. No.: 10/165,421

(22) Filed: Jun. 7, 2002

(65) Prior Publication Data

US 2003/0119390 A1 Jun. 26, 2003

(30) Foreign Application Priority Data

| Jun. 8, 2001 | (GB) | ................................................ 0113971 |
| Jun. 18, 2001 | (GB) | ................................................ 0114805 |
| Jun. 19, 2001 | (GB) | ................................................ 0114912 |

(51) Int. Cl.[7] .................................................. F16L 3/10
(52) U.S. Cl. ........................ 441/133; 138/106; 405/155
(58) Field of Search ........................ 441/133; 405/155; 138/106

(56) References Cited

U.S. PATENT DOCUMENTS

| 3,380,258 | A | * | 4/1968 | Young ........................ 405/155 |
| 3,656,309 | A | * | 4/1972 | Bultema ...................... 405/170 |
| 3,734,138 | A | * | 5/1973 | Brown et al. ................ 138/106 |
| 3,992,735 | A | * | 11/1976 | McCarthy .................... 441/133 |
| 4,197,033 | A | * | 4/1980 | Gendron ...................... 405/170 |
| 4,338,045 | A | * | 7/1982 | Cour ............................ 405/172 |
| 4,719,063 | A | * | 1/1988 | White .......................... 264/45.2 |
| 4,856,655 | A | * | 8/1989 | Barsky ........................ 206/524 |

FOREIGN PATENT DOCUMENTS

JP 2000-97371 * 4/2000

* cited by examiner

*Primary Examiner*—Sherman Basinger
(74) *Attorney, Agent, or Firm*—Reed Smith LLP

(57) ABSTRACT

A method of damping a conductor tube in a guide tube therefor comprises the steps of inserting a bag between the conductor and the jacket and filling the bag with a settable material to provide a resilient layer between the conductor and the guide tube.

58 Claims, 14 Drawing Sheets

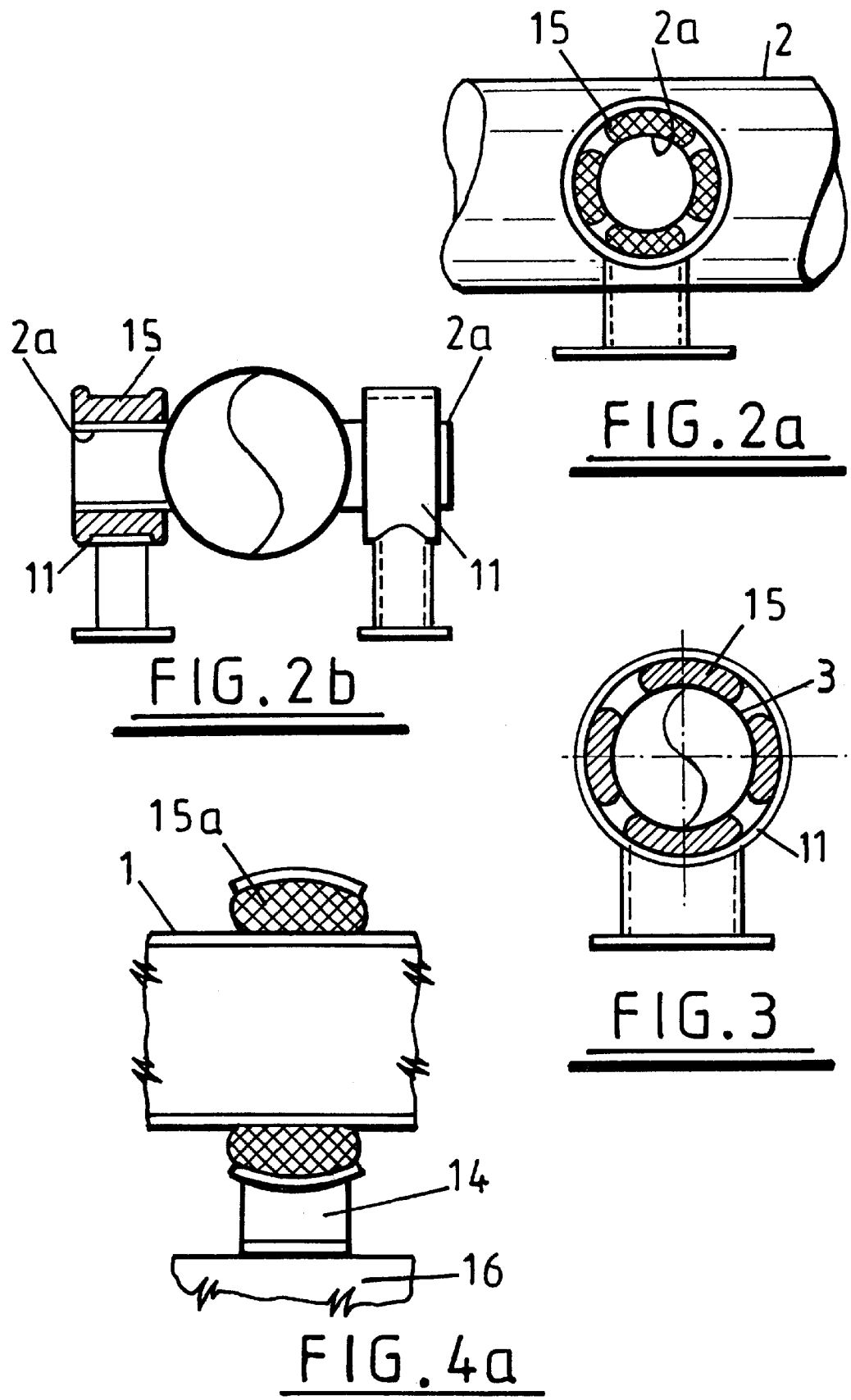

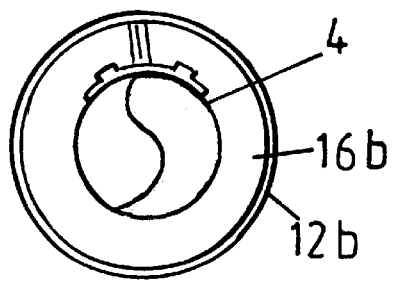
FIG.6a
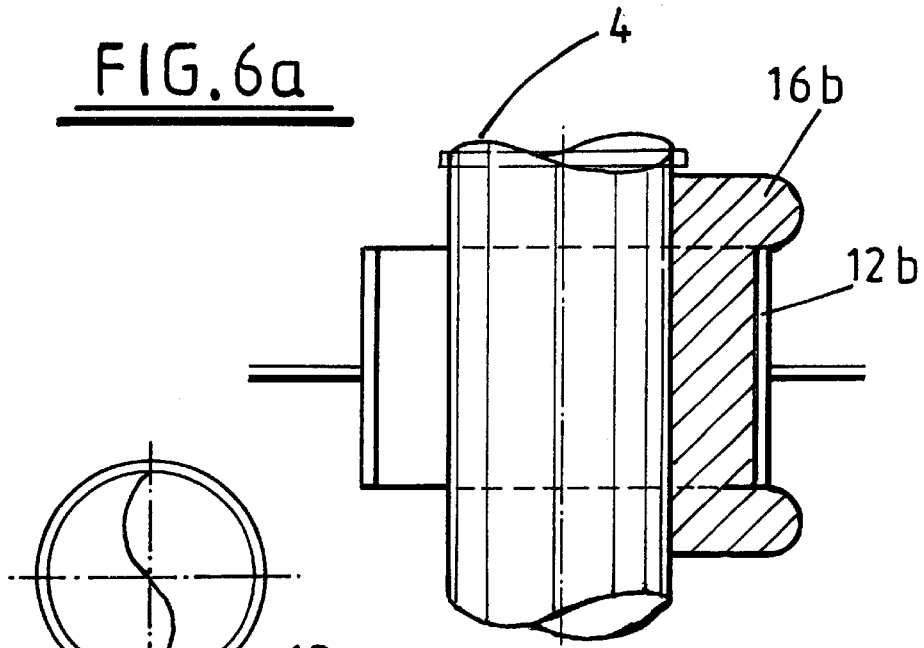
FIG.6b
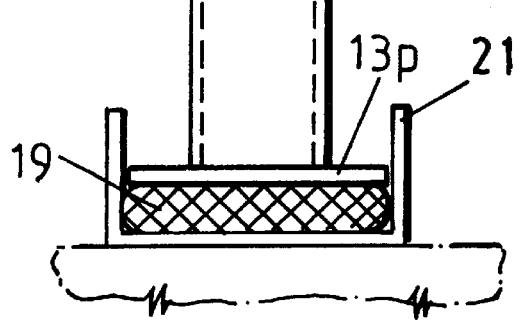
FIG.7a
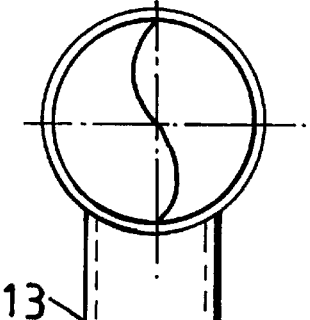
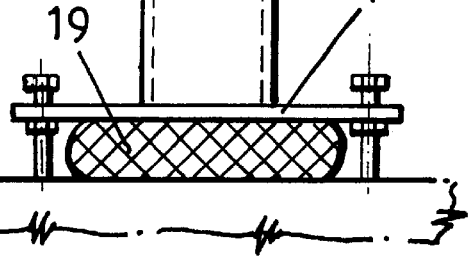
FIG.7b

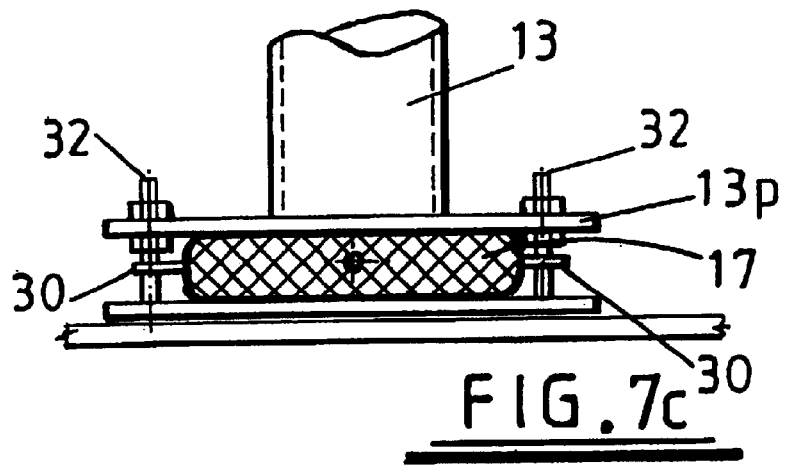
FIG. 7c
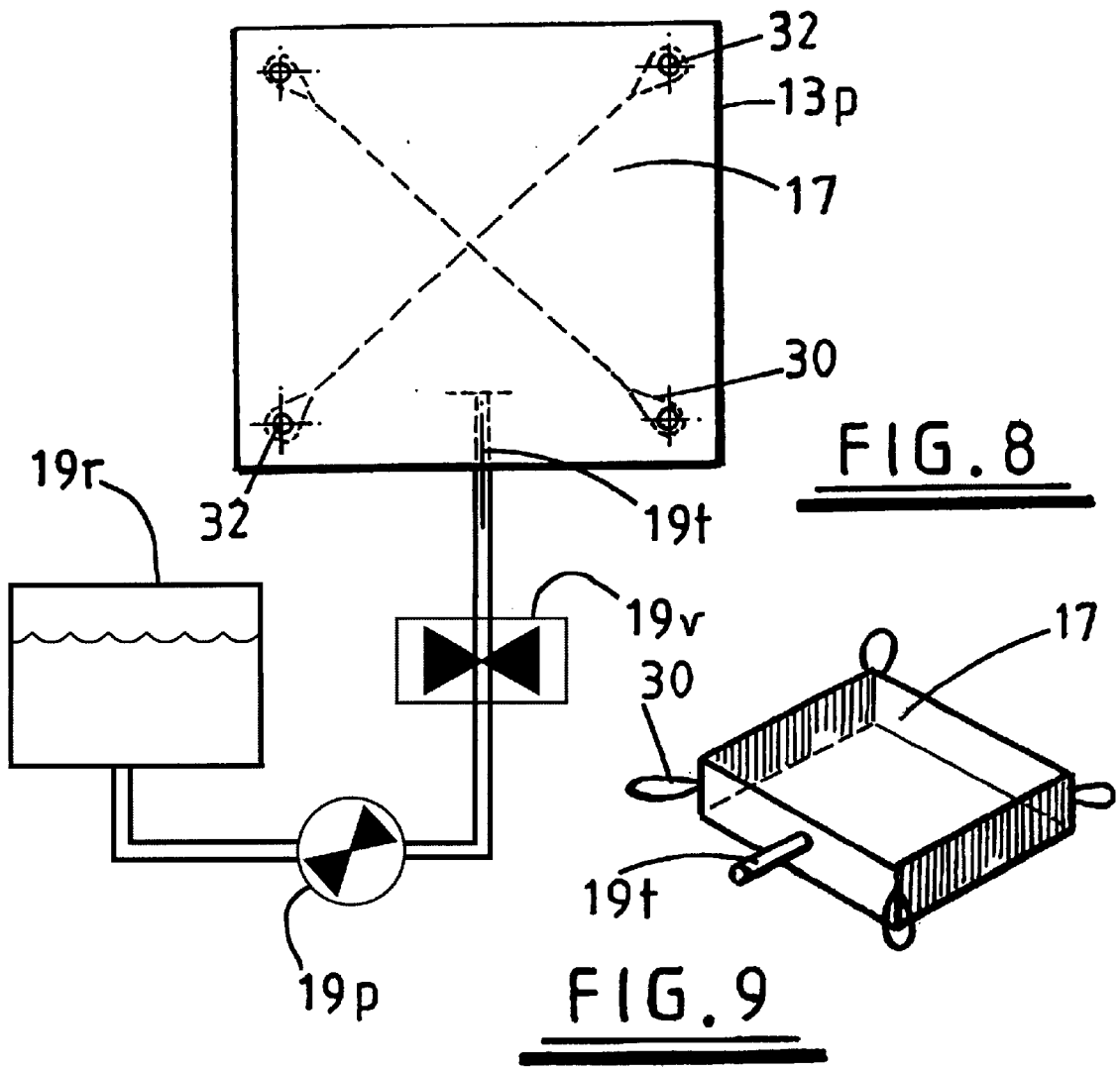
FIG. 8
FIG. 9

DAMPING OF CONDUCTOR TUBES

This patent application claims priority from U.K. Patent Application No. 0113971.6 filed Jun. 8, 2001, U.K Patent Application No. 0114805.5 filed Jun. 18, 2001 and U.K. Patent Application No. 0114912.9 filed Jun. 19, 2001.

This invention relates to a packing apparatus that is typically adapted for packing and/or supporting articles, such as pipes or pipe-work or equipment or machinery. The invention especially concerns damping of conductor tubes of offshore installations, such as fixed platforms, jack-up rigs and floating installations.

Many industrial structures and plant require a large network of pipes to convey fluids around the structure. In oil and gas plant, the large network of pipes requires a great deal of maintenance to control damage due to corrosion, erosion and fatigue. One particular problem associated with oil and gas plant is structural fatigue of pipes due to vibration. The vibration is generally unavoidable and typically results from the high-speed flow of fluid through the pipes, and on oil and gas platforms, it is general practice to support all pipes and pipe-work using structural supports. However, designing, making and installing these pipe supports is quite labour intensive, because the support brackets are generally fabricated in preset sizes, which may not precisely fit between a pipe and the nearest supporting structure. Therefore, in order to ensure a good fit between the pipe and the support bracket, shims are inserted on site between the pipe and the support bracket, so as to ensure that any space for vibration is minimised. Shims are also formed to pre-set sizes.

Drill conductor tubes in, for example, fixed offshore platforms run from the seabed up to the wellhead area passing through a series of guide tubes built into a steel jacket framework. The purpose of the conductor tube is to protect the high-pressure wellhead casing, which runs within it from environmental effects. The wellhead casing is guided within the conductor tube and hence the assembly moves laterally as a unit. The wellhead tree is attached to the top of the wellhead casing and is used for the connection of topside flowline pipework. The conductor and casing assembly acts as a tall slender structural element fixed at its base and carrying a large mass (the wellhead tree) at its top and having intermediate lateral guides in between.

The effects of wave and wind action are able to displace easily the conductor, which must then be restrained by the intermediate guides.

The conductors are installed after the jacket and topside structure by lowering the conductors through the jacket guides then grouting them into the seabed. The annular gap between a conductor and its guide tube must be sufficiently large to allow the conductor joint connectors to pass through and allow for misalignment of the guide tubes during fabrication of the jacket. The larger the gap the easier the conductors will be to install. However, a large gap will allow a conductor tube more freedom to move and hence cause large wellhead and flowline pipework movements. In addition, large impact forces will occur when the conductor tube contacts its guide tube.

Once the conductors are installed they can either have shims installed at the guides or they can be left free to move within the guides. In either situation problems can arise. If no shims are installed the conductors are free to move within the constraints of the guide tube. This should not affect the conductors or the guide tubes but the wellhead tree will experience larger than desirable movement and shock loading due to the conductor coming to an abrupt stop within its guide tube. This can cause large flowline pipework movement and vibrations, which can cause problems in the flowline pipework and attachments, in particular cumulative fatigue damage.

When shims are installed they tend to comprise steel strips forced down the annular gap between the conductor tube and its guide tube often completely eliminating any movement of the conductor tube. The practice of rigidly fixing the conductor tubes within the guide tubes is not recommended. Wave induced deflection of the conductor tube can induce large end moments if the conductor tube is rigidly fixed at its guide tube locations. The jacket guide tubes and framing members are generally not designed to resist these end moments. Local over stressing and fatigue problems can occur in the jacket structure if the conductors are rigidly fixed to the guide tubes.

An object of this invention is to provide a method and apparatus for packing or supporting articles, such as pipes, pipework, equipment or machinery.

According to the present invention there is provided a packing device comprising a container for containing a settable substance within the container.

Typically the container is flexible and/or deformable.

The container is typically placed between two items for packing purposes, typically so as to pack one item within the other and to limit the extent of movement of the one item within the other.

The settable substance is typically poured, injected or otherwise delivered into the container once the container is in place, and normally while the settable substance is in a liquid phase. After the container has been put in place and the settable substance has been delivered, optionally via a valve in the container, the viscosity of the settable substance then changes, so that the settable substance adopts a generally solid or at least a less fluid phase.

The viscosity of the settable substance delivered into the container can be varied, and although the viscosity of the settable substance is typically higher than the viscosity of the substance when initially delivered into the container, it is not necessary for the initial substance delivered to the container to be of low viscosity. For example, the initial settable substance delivered to the container could be a gel or a sol. Equally, while the viscosity of the substance once set is typically higher than when it is initially delivered into the container, the viscosity of the final set substance might also vary between applications, and in some embodiments could be a gel or a sol, while in other embodiments the final set substance could be a hard plastics material.

The compliance of the set substance can even be varied within the container, so that when the substance has set, the container has different zones of hardness. This is particularly useful where some pliability of the device is desirable in the immediate vicinity of the item to be packed so as to prevent some slight movement but so as to prevent excessive vibration or other movement beyond certain parameters. In such embodiments, the compliance of the substance disposed immediately against the item to be packed can be less than the compliance of the settable substance in other parts of the container, for example around the outside of the container, spaced apart from the item to be packed. This can be accomplished by different zones within the container containing different compositions of settable material, or by a gradient of compliance of the settable substance within the container.

The invention also provides a method of packing an item, the method comprising inserting a packing device between the item and an adjacent structural support, the packing device comprising a container, inserting a settable substance into the container and allowing or promoting a change of viscosity of the settable substance.

The invention also provides a method of supporting a pipe, the method comprising inserting an inflatable bladder between the pipe and an adjacent structural support so as to take free space between the pipe and the adjacent structural support.

The invention also provides a pipe support comprising an inflatable bladder.

Typically, the bladder is inflated with a fluid that is settable, i.e. a fluid that can adopt different phases.

Typically the settable substance is delivered into the container via a valve in the container, and sets hard over a period of time or when induced to set by a catalyst or the like. Typically the packing device assumes a shape when set that conforms to at least a part of the space between the item and the adjacent structural support, thereby occupying the space between the item and the support, and preventing or limiting movement of the item.

The settable substance can be a polymer such as polyurethane, and can be delivered to the container in liquid form, and then allowed to polymerise within the container.

The possible triggers for polymerisation of the substance can include time, heat, light and catalysts. The set substance typically has plastic and/or elastomeric properties, or can be completely hard. The hardness characteristics of the set substance can be adjusted by adjusting the density of cross-linking within the set polymer. This can be achieved, for example by adding cross-linking agents, or adjusting the characteristics of the feedstock isocyanates and alcohols. Indeed, the hardness, strength, stiffness, abrasion resistance, toughness, frictional coefficient, and other characteristics of the substance can be adjusted in the final set in accordance with the desired characteristics for each particular application, The addition of low-cost fillers to the injected substance can reduce the amount of the higher cost polymer required to fill the container and thereby reduce the cost of certain embodiments.

Fillers and fibres can be added to the material injected into the container to form a composite material for additional strength or other characteristics. The set material can be made fire retardant or resistant by the addition of certain materials. In certain embodiments, the device can incorporate intumescent material.

The container can be flexible and in preferred embodiments of the invention can comprise a bag or tube. The container can typically be in the form of a closed bag of generally rectangular or other shape although the precise shape of the bag is unimportant, as this can be fabricated to suit individual structures and/or spaces. However, generally rectangular bags can be inflated to adopt a wide variety of shapes that fill spaces between a large number of pipes and supports, thereby providing some flexibility, and reducing the need to carry a large number of different sizes of bags to suit individual circumstances. In certain embodiments, the container can initially take the form of an endless tube that can be sealed where desired on-site in order to fit within various spaces that are encountered. The material of the bag can be a plastics or rubber material, such as nitryl or butyl rubber, and in some preferred embodiments the material can be puncture resistant so as to resist puncture while the injected material is still in liquid form within the bag. Indeed, the container can comprise two skins in certain embodiments, with an inner skin to contain the polymer or other settable substance, and outer skin to resist abrasion damage and/or thermal damage or puncture by structural support.

It should be noted than puncture and abrasion resistance is only desirable in certain circumstances while the injected material is polymerising into a solid (or more solid) phase, after which point, abrasion damage or puncture to the bag or container does not affect the functioning of the device, as the packaging function is performed by the set material.

It should also be noted that it is not necessary for the bag to expand to fill the whole of the space available, and that the bag not need even expand to its full extent. It is sufficient for the bag to be capable of expanding to be disposed between the two items to be packed, and this can be achieved as easily when the bag is half full as when it is completely full.

The invention also provides a method of adjusting the position of a pipe or other item of equipment within a supporting structure, the method comprising inserting an inflatable bladder between the pipe and the supporting structure, and inflating the bladder to move the pipe relative to the supporting structure.

This aspect of the invention can be used to centre or otherwise adjust the position of pipes or other item of equipment within structural supports, or to pre-load pipes with force in a particular direction within a supporting structure, which is frequently required within oil and gas plant.

In certain embodiments, the inflatable bladder can have a valve and can be connected via a conduit to a hydraulic pressure source in order to adjust the pressure on the inflatable bladder. In certain embodiments, many different bladders are provided, and all may be connected, optionally via valves, to a manifold that controls pressure distribution to all of the bags or bladders in order to co-ordinate movement of the pipe, or pre-loading force.

In embodiments of the invention where the transmission of force is contemplated, the provision of bags or bladders with large surface areas is a particular advantage, as large forces can be applied to the pipes by such bags or bladders, with relatively little movement.

In typical embodiments, the bag or bladder is positioned adjacent to the pipe, but in certain other embodiments, the bag or bladder can be integrated into the pipe supporting structure, or disposed between the immediately adjacent pipe support, and a more distant hard point. For example, in certain preferred embodiments the bag or bladder is positioned immediately adjacent the pipe between the pipe and the cradle or saddle against which the pipe normally rests. However, in some other embodiment, the bag or bladder can form part of the cradle or saddle, or the leg of the cradle or bracket, or can be disposed underneath a duck foot.

The invention also provides a method of moving an item comprising placing a packing device against the item, inflating the packing device with fluid, and optionally allowing the fluid in the packing device to change phase.

Bags and bladders can be placed in horizontal and vertical or other planes in order to move the pipe or other item in such planes.

Certain embodiments of the invention reduce the need for on-site adjustments of shims. Devices can also be designed with frictional coefficients that reduce the need for shoes to be installed at pipework supports in order to reduce abrasion damage to the pipes causes by the pipework supports.

Certain embodiments can also provide a damping function to the packing supports. By specifying different hardness values for the polymer, the stiffness of the damping function can be tailored to suit each application. This is extremely useful for pipework made from long-lasting materials that can be subject to fatigue due to vibration damage.

According to the present invention there is provided a method of damping a conductor tube in a guide tube therefor comprising the steps of inserting a bag between the conductor and the jacket and filling the bag with a settable material to provide a resilient layer between the conductor and the guide tube.

The present invention also provides a damping device for use between a conductor tube and a guide tube therefor comprising a bag adapted and shaped for insertion between a conductor tube and its guide tuba and adapted to be filled by a settable material.

The bags used in the invention are preferably sized so as to end only over a portion of the periphery of a conductor tube. In practice it may be convenient to use say four bags to damp a conductor tube, the bags being generally evenly spaced about the conductor tube. Spaces between adjacent bags can then be used to insert temporary chocks between the conductor tube and its guide tube in order to centralise the conductor while the material introduced into the bags sets.

The bags are preferably made of a material that is substantially impervious to the settable material. Synthetic fabrics are preferred materials for the bags and preferably such fabrics are coated with synthetic material. For example, the bags may be made of reinforced nylon coated with PVC. The bags themselves are preferably capable of withstanding pressures of at least 2 bar. The bags may be made by joining appropriately shaped sections of fabric such as, for example, by stitching and/or ultrasonic welding.

The settable material may be any suitable synthetic material that can be poured, injected or pumped into a bag and then set to provide a resilient slab. It is also desirable that the material when set be resistant to chemicals and to seawater. It is believed that polyurethane may be a suitable settable material for use in the invention. The bags may be partitioned, whereby different filling materials may be used in different sections of the bag. That may allow use of a bulking material to form a core with more or less resilient material used in outer regions of the bag to provide the requisite damping effect. The hardness of various sections of the slab may be adjusted by the same means.

The bags of the invention preferably have not only a filling port but also a vent to allow displacement of air as the bags are being filled.

Guide tubes for conductor tubes generally comprise a lower cylindrical part and a flared upper part, which facilitates the insertion of a conductor tube through the guide tube. The bags of the invention preferably have upper and lower parts that when expanded correspond with the cross-sectional shape of the annular gap between the cylindrical conductor tube and its guide tube. Preferably the bags will be sized so as to extend below the guide tube and the lower ends of the bags will preferably be shaped so as to expand to form a lip or bulge along their bottom edge that extends outwardly of the guide tube. The top and bottom shaping of the bags is intended to produce a filled bag that is resistant to axial displacement. The bags may have on their surfaces that contact the conductor tubes a layer or coating of a friction reducing material to enable the conductor to move axially with minimal or no displacement of the bag. Such a friction reducing material may be, for example, PTFE.

In some situations, the guide tubes may also have a flared lower section, in which case the bags to be used therewith will preferably have a lower section with divergent opposed faces to result in a filled shape corresponding to the profile of the annular gap in the region of the lower flared section of the guide tube.

Filling the bags with settable material only is generally suitable for clearances between the conductor and guide of upped 50 mm. For larger clearances it may be desirable to include in the bag a core. The inclusion of a core will reduce the amount of settable material needed and will also provide shape retention and stiffness to the bag during setting. The core may be a solid or may include voids to alter damping characteristics. The core may be provide with passages therethrough to allow flow of settable material through the core for even spread of settable material around the core and to help fix the core. The core may be made of synthetic material and may be made from a foamed or expanded material, such as of polystyrene. The core will preferably be adhered to or otherwise fixed to a bottom wall of the bag.

As an alternative to providing a core within the bag, a similar effect may be achieved by including in the beg void pockets.

It may be desirable to provide the bags with means for locating same prior to filling. To that end it is proposed that the bags have one or more hooks, clamps or the like to locate over a top edge of the guide tube, The hooks or clamps may simply be attached to a top part of the bag. On the other hand it may be desirable to provide some rigidity to the bags to facilitate feeding them into the annular gap between the conductor tube and the guide tube, in which case stiffening rods or the like may be attached along sides of the bags, such as in pockets on the side edges of the bags, and clamps or hooks may be attached to ends of these rods, either to top ends or to both ends.

The present invention will now be described, by way of example only, with reference to the accompanying drawings, in which FIGS. 1a, b and c are end views of pipes in support channels;

FIG. 2a is a side view of a pipe in a further support bracket;

FIG. 2b is an end view of the FIG. 2a arrangement;

FIG. 3 is an end view of the pipe in a further bracket;

FIG. 4a is an end view of a pipe in another bracket;

Figure 5A:
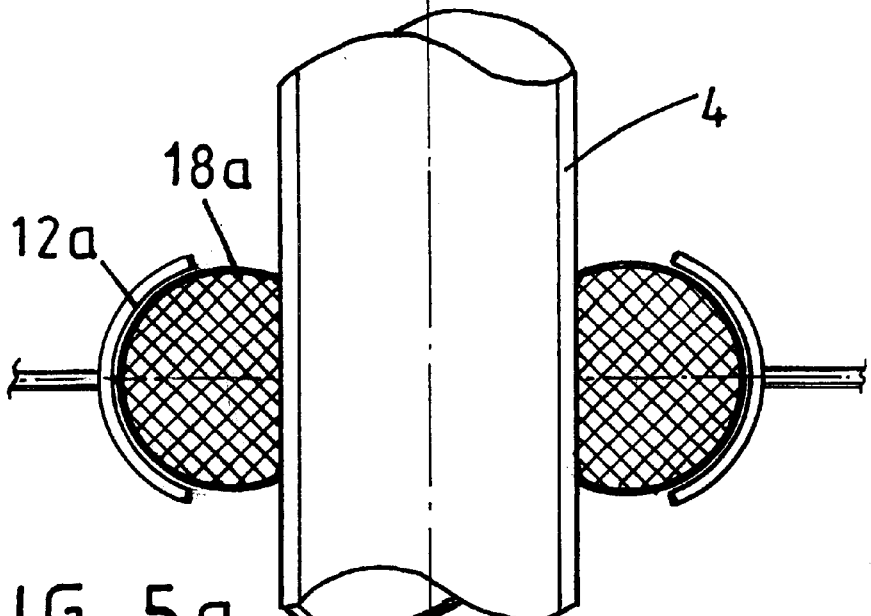
Figure 5B:
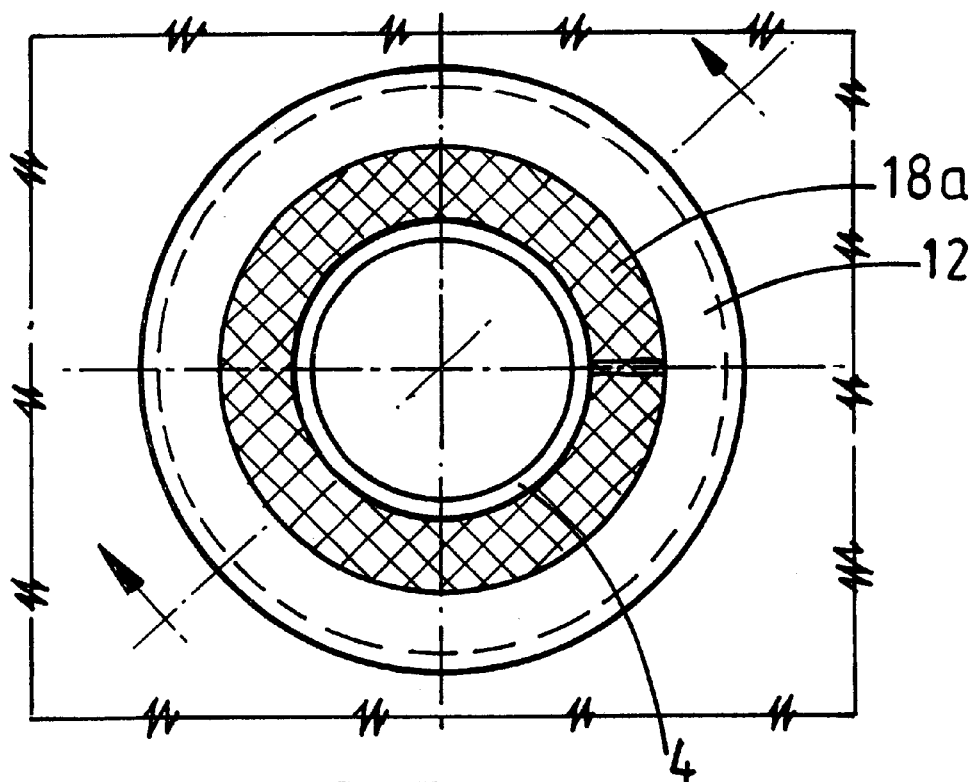
Figure 10:
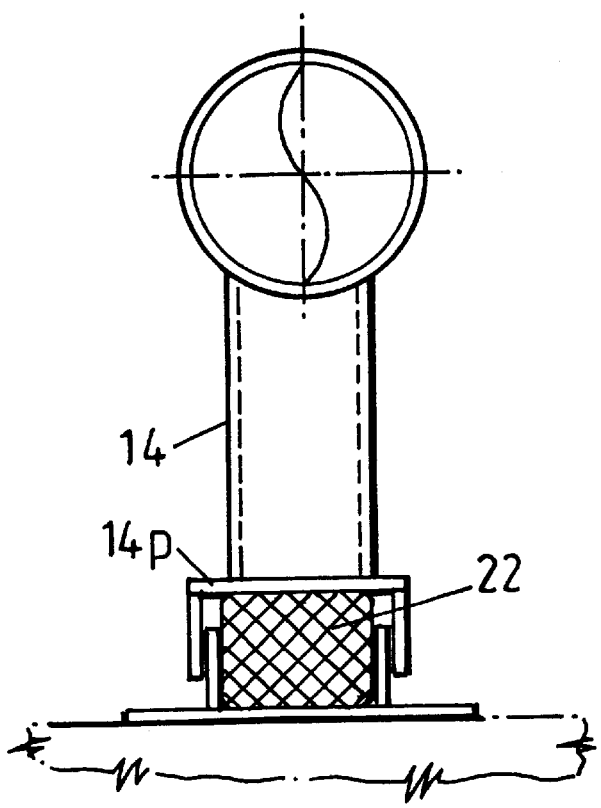
Figure 11:
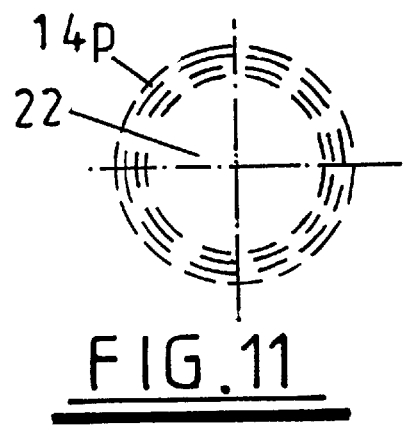
Figure 16:
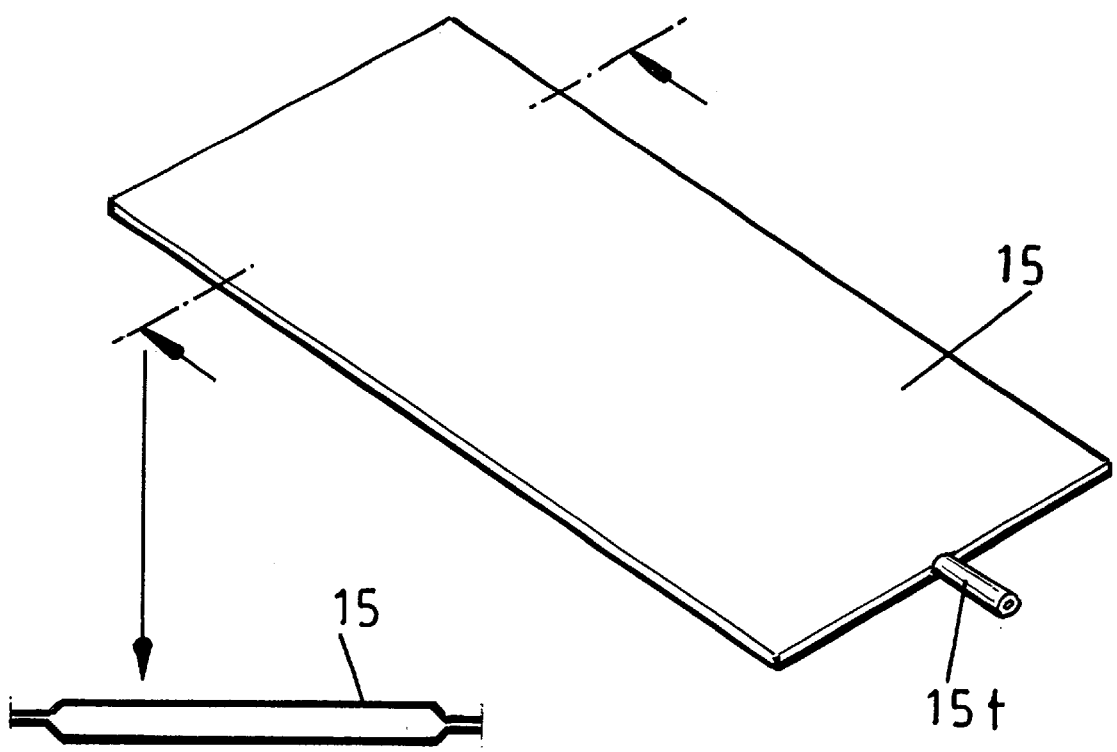

FIGS. 5a and b are sectional and end views of a pipe supported from a deck or bulkhead;

FIG. 6a is a top view of a pipe passing through a deck;

FIG. 6b is a side sectional view of the FIG. 6a arrangement;

FIGS. 7a, b and c are side sectional views of duck foot pipe supports;

FIG. 8 is a top view of the FIG. 7c arrangement;

FIG. 9 is a perspective view of a bag for use in the FIGS. 7c and 8 arrangements;

FIG. 10 is a side sectional view of a further duck foot pipe support;

FIG. 11 is a plan view of the FIG. 10 arrangement;

FIGS. 12, 13, 14 and 15 are end views of pipes supported on base trays;

FIG. 16 is a perspective view of a bag.

Figure 17:
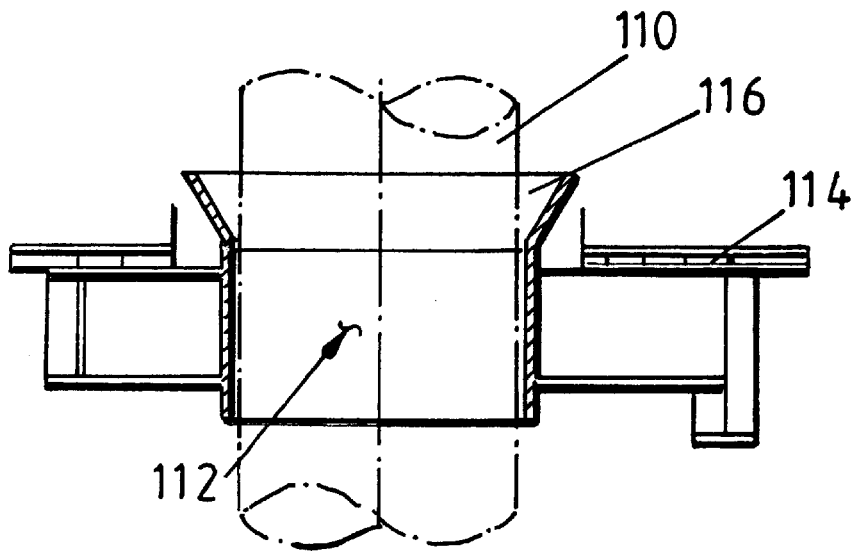
Figure 18:
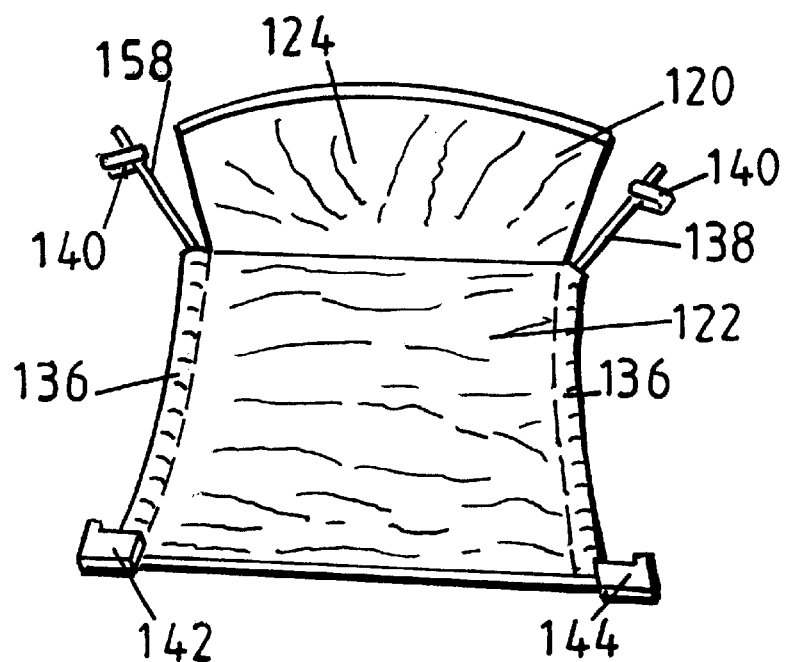
Figure 19:
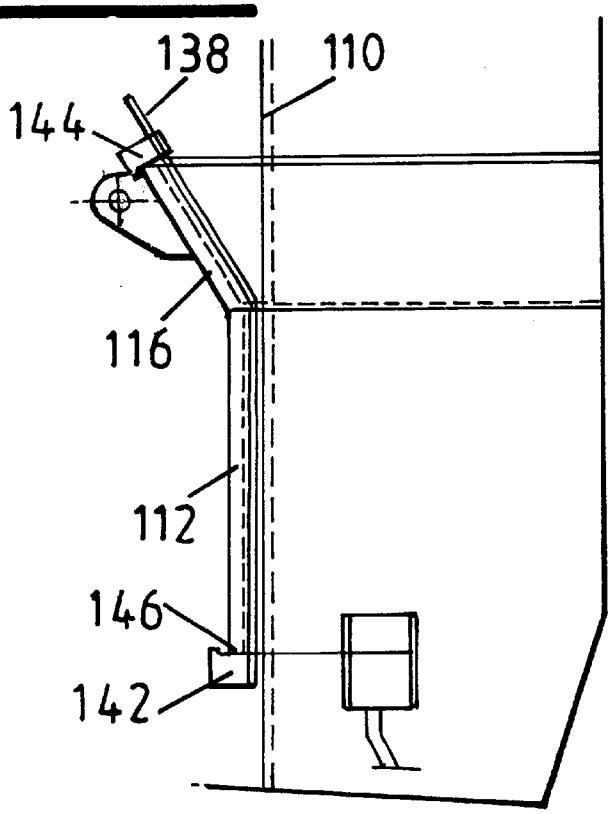
Figure 20:
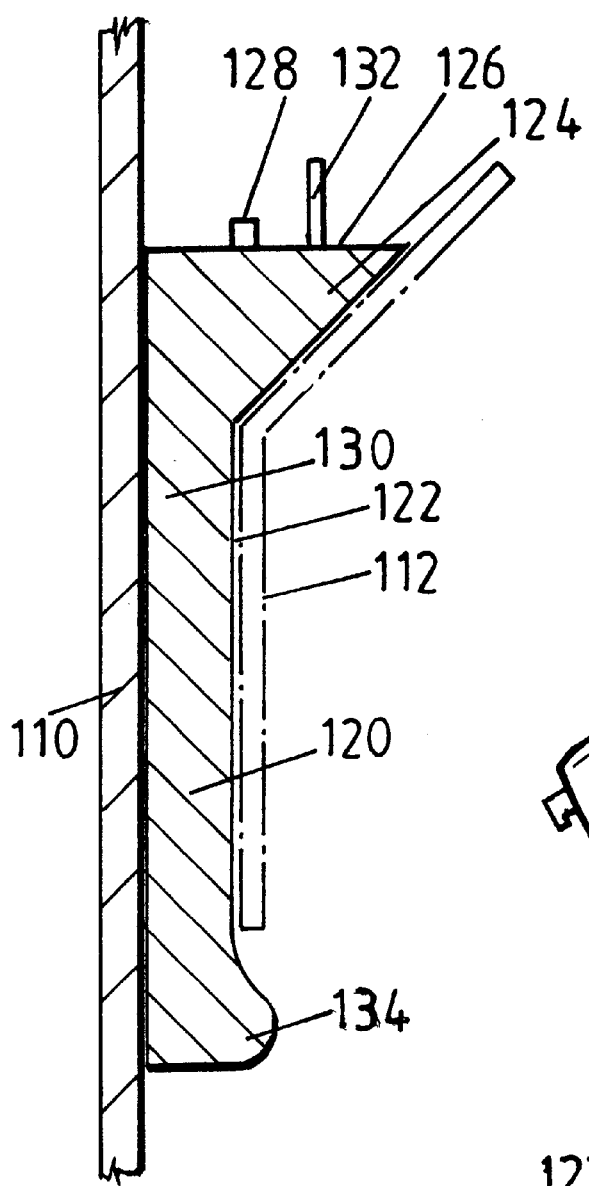
Figure 21:
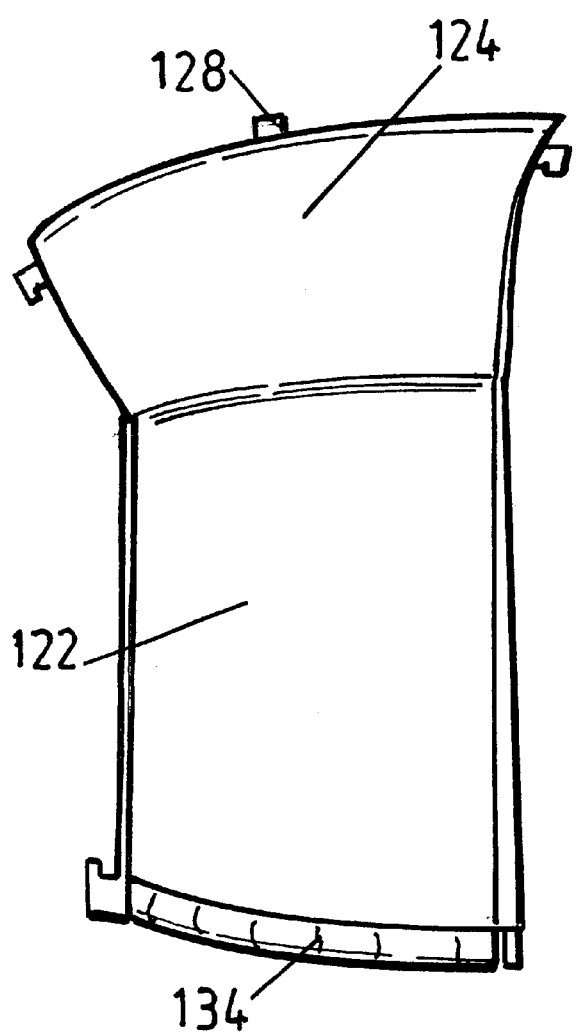
Figure 22:
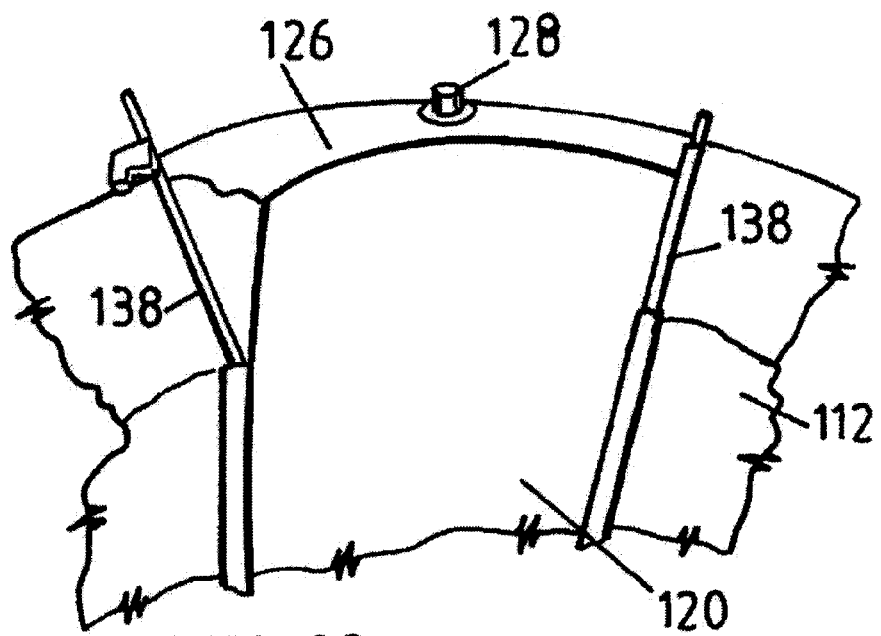
Figure 23:
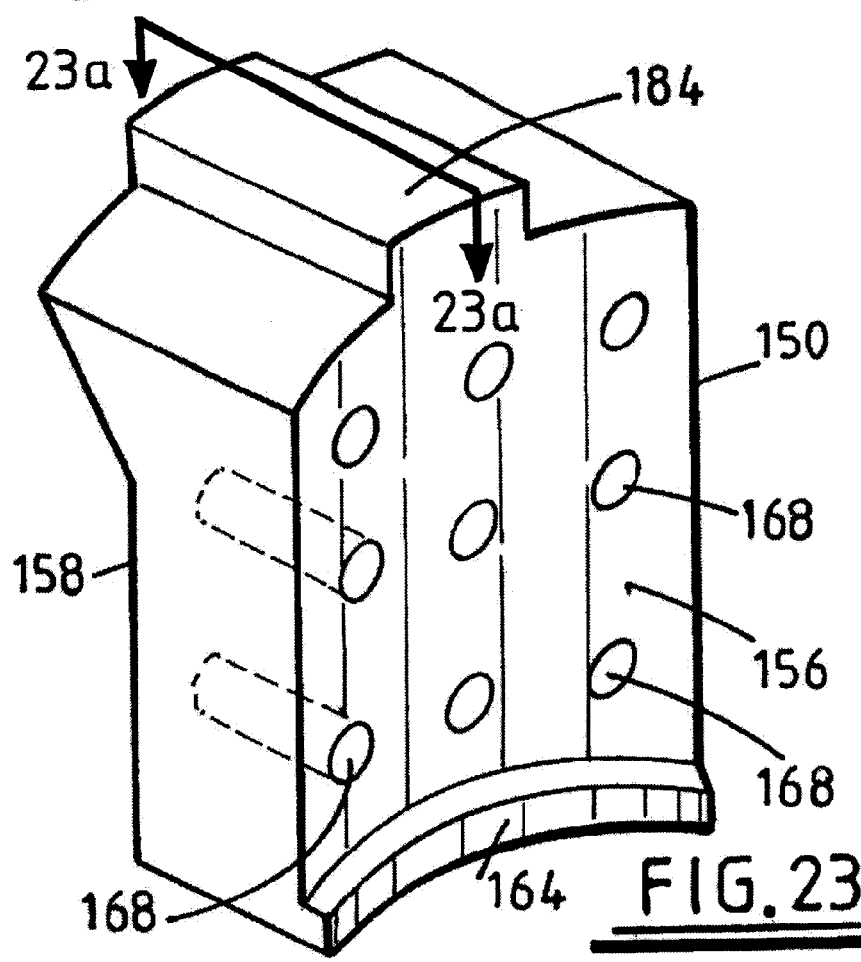
Figure 23A:
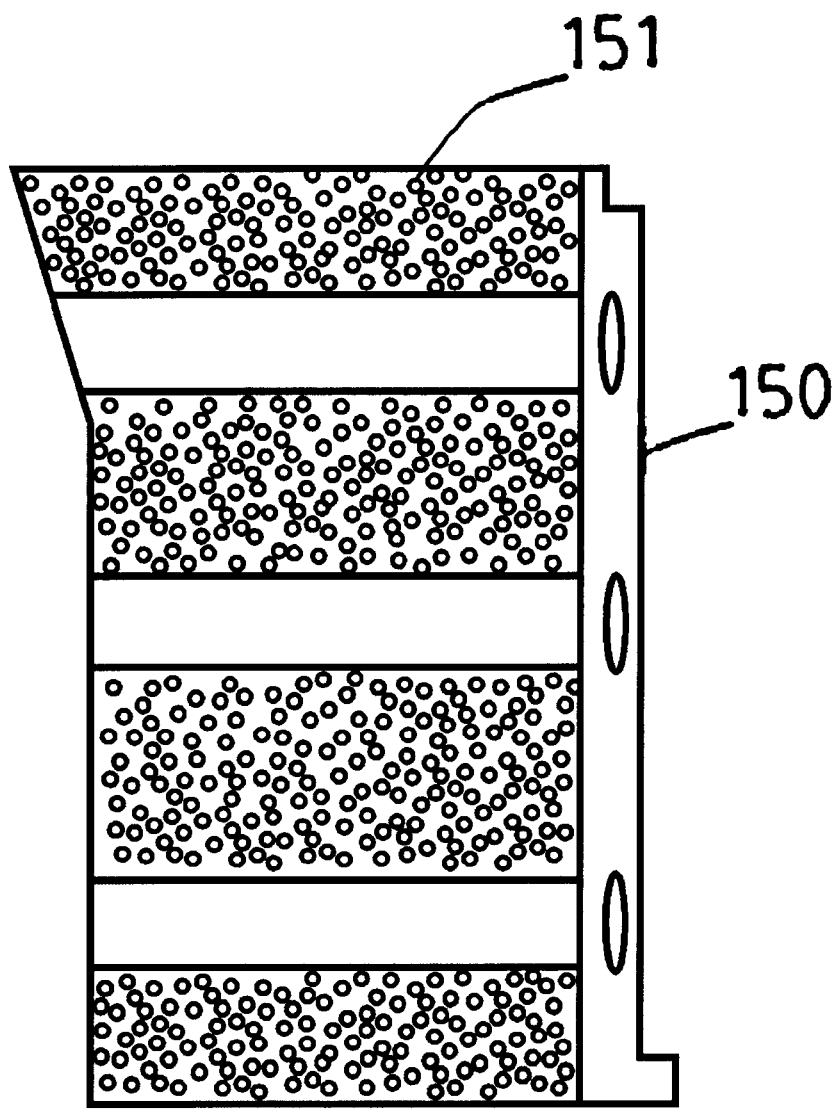

FIG. 17 shows a typical conductor tube and guide tube arrangement for an offshore platform;

FIG. 18 shows a damping bag according to the invention;

FIG. 19 is a section through a conductor tube and guide tube showing fitting of a damping bag of FIG. 18 prior to filling;

FIG. 20 is a section through a conductor tube and guide tube with a filled damping bag;

FIG. 21 shows a filled damping bag removed from the conductor/guide tube arrangement;

FIG. 22 shows the internal arrangement of damping bags in the guide tube with the conductor tube removed;

FIG. 23 shows a core for use in a damping bag for a wide annular space between a conductor tube and guide tube;

FIG. 23a is a view taken along cross sectional line 23a—23a of FIG. 23.

Figure 24:
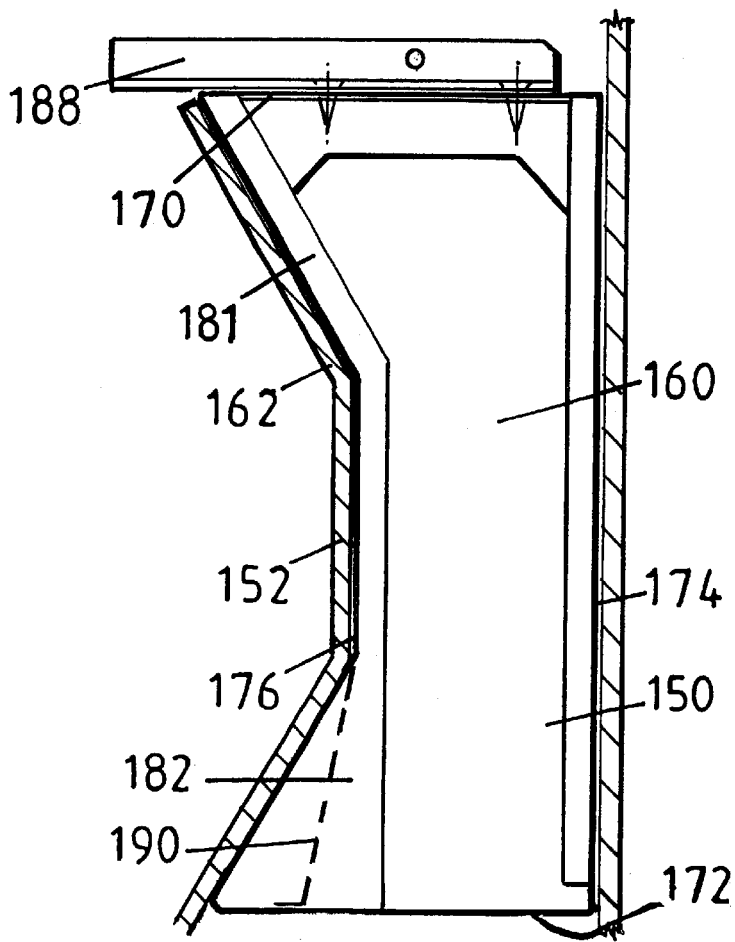
Figure 25:
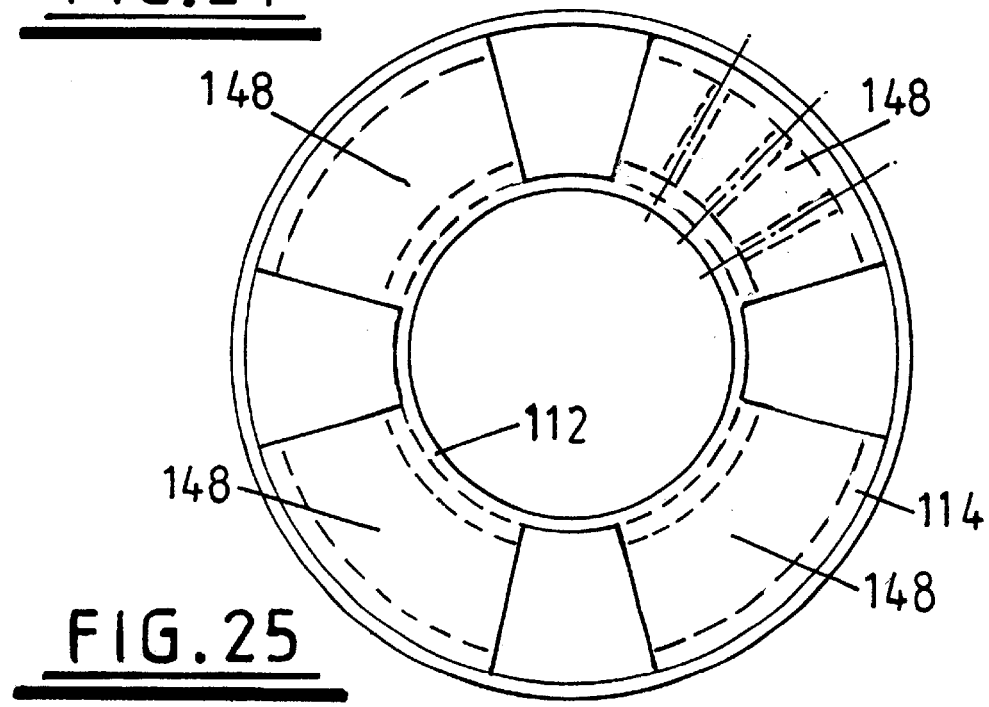

FIG. 24 is a section through a conductor tube and guide tube arrangement with a wide annular gap and a damping bag including a core as shown in FIG. 23 in situ; and FIG. 25 is a plan view of the arrangement of FIG. 24.

Figure 1A:
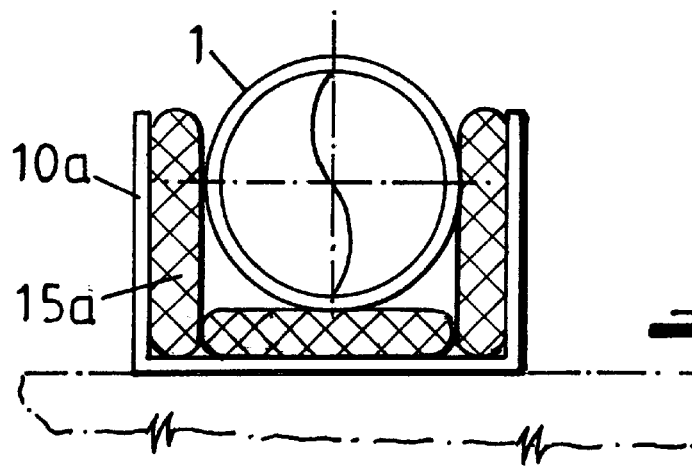

Referring now to FIG. 1a of the accompanying drawings, a pipe 1 is supported in a channel 10a. The pipe 1 is spaced from the walls of the channel 10a by means of shim bags 15a, which centre the pipe 1 within the channel, and prevent relative movement between the two.

Figure 12:
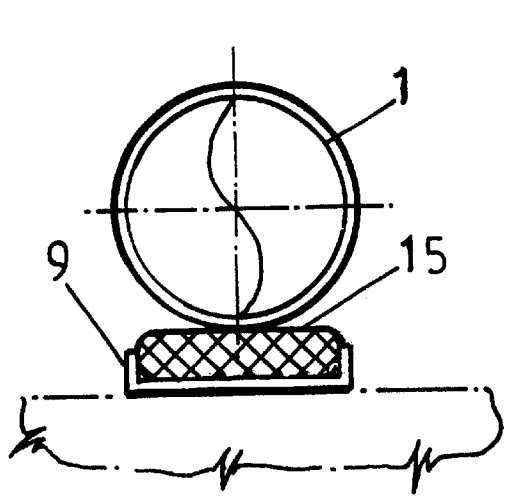

The shim bag 15(a) is shown in FIG. 16 and typically comprises a synthetic rubber or plastics bag, for example of polychloroprene, that is typically glued, welded or stitched at the seams and has a tube 15t extending from one end to permit the injection of fluid into bag 15. The tube 15t optionally has a valve (not shown). The bag 15 is sealed and is initially flat, but injection of fluid through the tube 15t inflates the bag 15 so that it adopts the configuration shown in FIG. 1. It should be noted that the configuration of the bag 15 shown in FIG. 12 is a flat rectangle, but bags can be made in various shapes and sizes that can essentially be shaped to fit the free space between the pipe 1 and the support as near as possible.

The bag is typically filled with polyurethane which is initially injected in liquid form, but which polymerises within the bag to form a solid mass that conforms to the external shape of the bag once inflated. It will be appreciated that if the bag 15 is inflated in situ against the pipe wall between the pipe and this support, then the final form of the polymerised substance within the bag will conform to portion of the external wall of the pipe that is in contact with the bag during setting of the polymer.

Figure 1B:
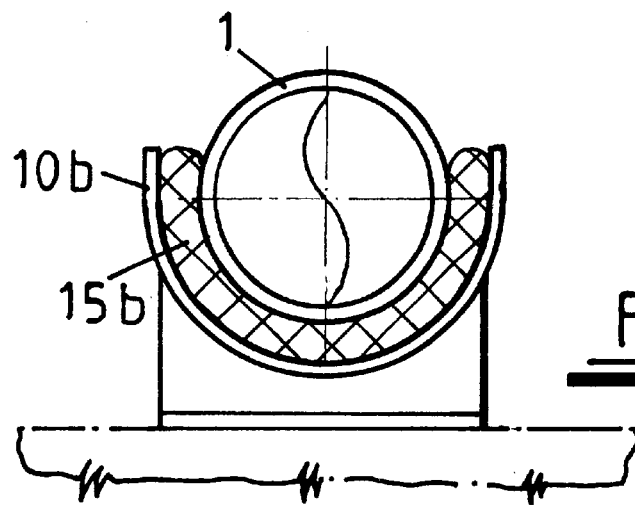
Figure 1C:
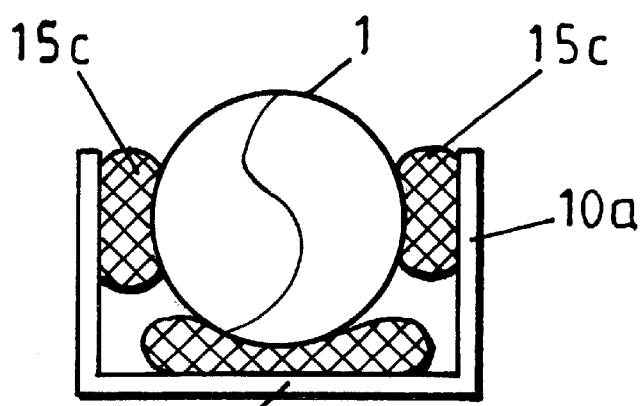

FIGS. 1b and 1c show variations on the embodiment of FIG. 1a. In FIG. 1b the pipe 1 is supported in a semicircular section channel 10b by means of a single shim bag 15b. In FIG. 1c again a channel 10a is used but the shim bags 15c are smaller in area covered than those shown in FIG. 1a.

As shown in FIGS. 2a and b, a pipe 2 having support arms 2a extending laterally from the pipe 2 is restrained by means of support collars 11 mounted on legs and attached to a wall or floor. The support arms 2a each extend into the bore of collars 11 and are centred therein by means of shim bags 15. The bags 15 are filled with polyurethane once in position, and this is allowed to polymerise over time (between 1–12 hours) to a hard plastic. The hardness of the set polyurethane can be adjusted by changing the density of cross-links in the polyurethane at a chemical level, as is well known in the art.

Referring now to FIG. 3, a pipe 3 is centred within the bore of a collar 11 by means of bags 15 as previously described. The bags 16 are placed in position between the collar 11 and the pipe 3 around the circumference of the pipe 3, and then inflated with polyurethane liquid which is allowed to set to a solid of variable compliance, for example to a hard plastic. The arrangement shown in FIG. 3 can be used in a horizontal or vertical orientation, as can the arrangement shown in FIGS. 2a and b.

FIG. 4a shows a pipe 1 supported in a ring bracket 14 mounted on a structure 16 by means of shims 15a.

Figure 4B:
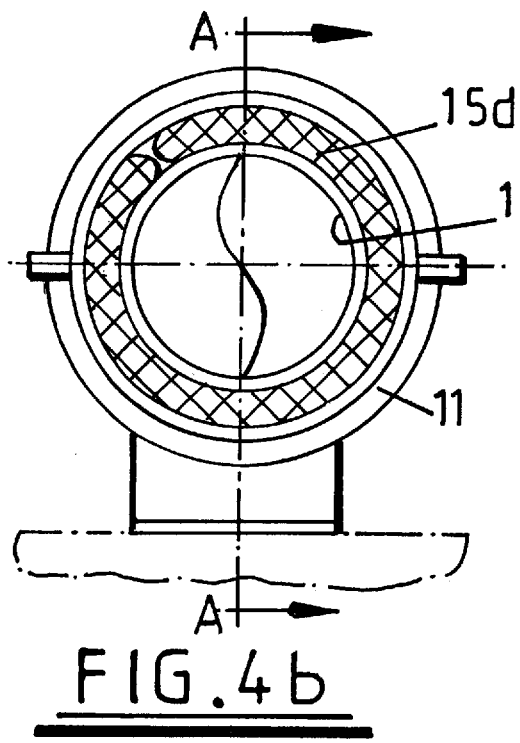
FIG. 4b is an end view of a pipe in yet another bracket.
Figure 4C:
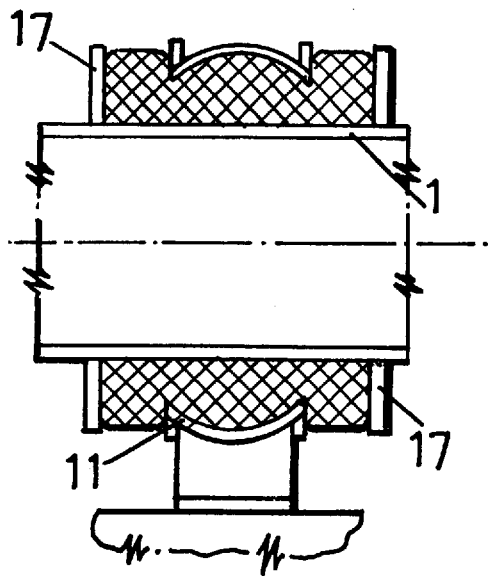
FIG. 4c is a section on line AA of FIG. 4b.

FIGS. 4b and c show a pipe 1 supported in a collar 11 by means of a single bag 15d around the pipe. The bag extends beyond the edges of the collar but is contained between stop rings 17 fined to the pipe.

Figure 4D:
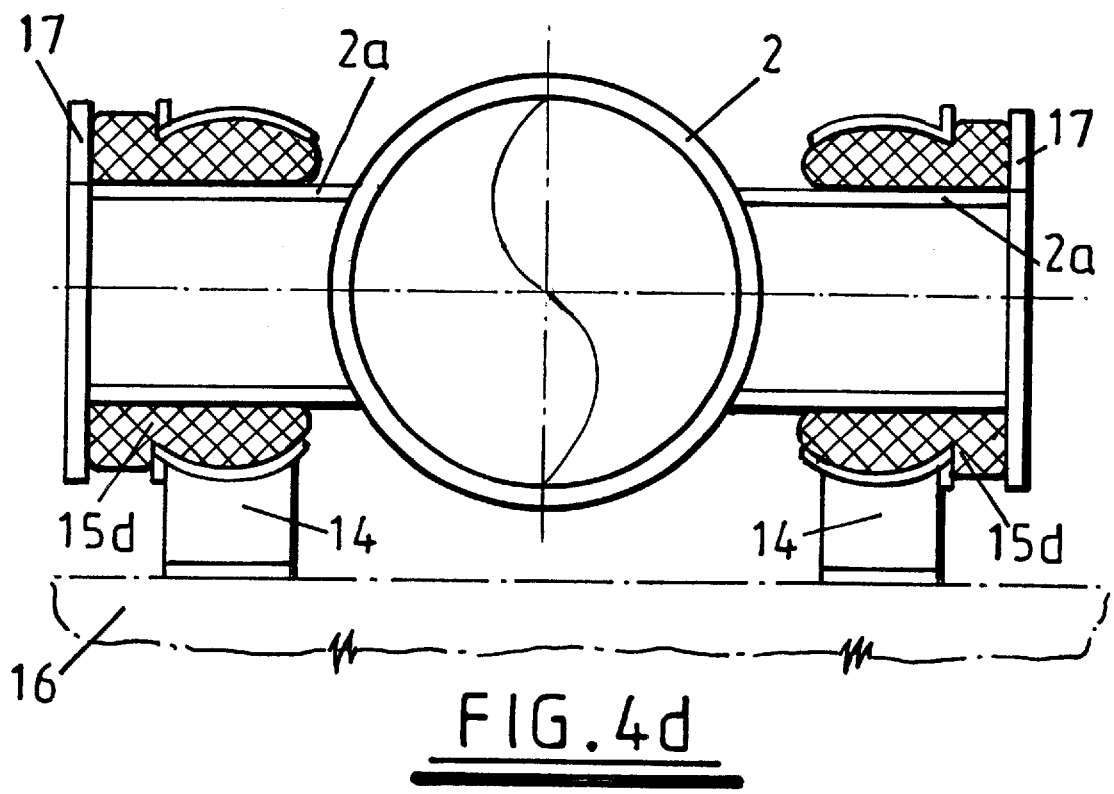
FIG. 4d is an end view of a pipe in yet another support bracket

FIG. 4d shows a similar arrangement applied to a pipe 2 mounted between support arms 2a. The support arms 2a extend through ring brackets 11 mounted on a structure 16 and are centred therein by means of bags 15d. The support arms 2a each have stop rings 17 at their outer ends to contain the bags 15d.

Turning to FIGS. 5a and b, a single bag 18a cushions a pipe 4 within a radius coaming 12a fixed to a deck or bulkhead (not shown). The bag 18a has thicker or stiffer rubber on its radius section and thinner rubber on its face contacting the pipe and at ends of the bag that are jointed. The joint may be covered by intumescent tape to ensure a fire seal.

Referring now to FIGS. 6a and b, pipework frequently has to pass through a deck on oil or gas plant, and FIGS. 6a and b show a pipe 4 passing through a deck sleeve 12b in which it is centred and packed by means of an inflatable collar 16b comprising a bag essentially as previously described that is disposed in the annulus between the pipe 4 and the deck sleeve 12b, filling it completely. The collar 16b has an inlet tube and valve (not shown), and once placed in position around the circumference of the pipe 4, between the pipe 4 and the deck sleeve 12b, it is filled with liquid polyurethane, which is allowed to set within the collar 16b to a solid of variable compliance, for example a hard plastic. Once set, the pipe 4 is held against vibration by means of the hard plastic in the shape of the collar 16b. It should be noted that once the polyurethane has set to, for example, a hard plastic, the bag 16b is no longer required, and can be abraded, punctured, damaged or even removed completely without affecting the function of the device. In the embodiment shown in FIGS. 6a and b, intumescent tape can be fixed to the collar 16b, the deck sleeve 12b and/or the pipe 4 in order to reduce the risk of fire spreading between the decks. Optionally, the collar 16b can be filled with polyurethane substance having fire-retardant additives.

Referring now to FIGS. 7c, 8 and 9, a further form of shim bag 19 is placed underneath the foot of a support bracket 13 above which a pipe (not shown) is supported by the bracket 13. The bag 19 is disposed between the so-called duck foot 13p of the bracket 13 and the deck or wall to which the duck foot is attached so as to take up free space between the bracket and the structural member of the wall or deck, rather than being disposed immediately beside the pipe. As previously described, the bag 19 has an inlet conduit or tube 19t and optionally a valve 19v through which it can be inflated with polyurethane, which can be allowed to set as described above. The polyurethane may be provided from a reservoir 19r through a hydraulic pump 19p which pumps the polyurethane to the bag 19. Locating straps 30, or some other suitable location devices (not shown), protrude from or are attached to the shim bag 19, and the locating straps 30 may be placed around respective pins 32 provided on the duck foot 13p, such that the shim bag 19 is prevented from excessive movement away from the duck foot 13.

FIGS. 7a and b show similar arrangements to that of FIGS. 7c, 8 and 9, except that in FIG. 7a the injection bag 19 is contained within a base pot 21 and in FIG. 7b the bag 19 is held under duck foot 13p.

FIGS. 10 and 11 show a similar embodiment of a bag 22 that is contained within an expandable shoe underneath a duck foot 14p and has a generally cylindrical shape.

In certain preferred embodiments of the invention, the bag can have two or more compartments that can receive different formulations of settable substance, so as to permit variations of the hardness and/or other characteristics of the final set material in different parts of the device. In preferred embodiments of this type, the portion of the bag closest to the pipe being supported is filled with polyurethane, which is adapted to set to a relatively plastic or elastomeric form, so as to permit some movement of the pipe than can be accommodated by the elastic deformation of the portion of the set bag. The thickness of the plastic or elastomeric portion can be varied in order to set the maximum parameters of elastic accommodation of movement by the pipe, and in preferred embodiments of this type, the remainder of the bag is filled with polyurethane that is adapted to set to a relatively harder finish that does not accommodate substantial movement of the pipe.

Figure 13:
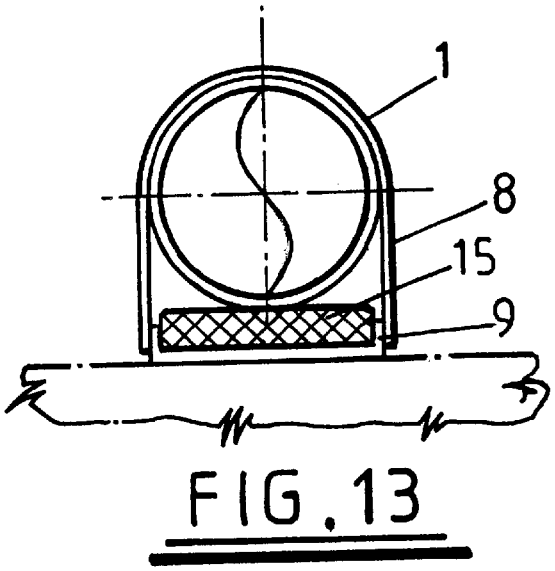
Figure 14:
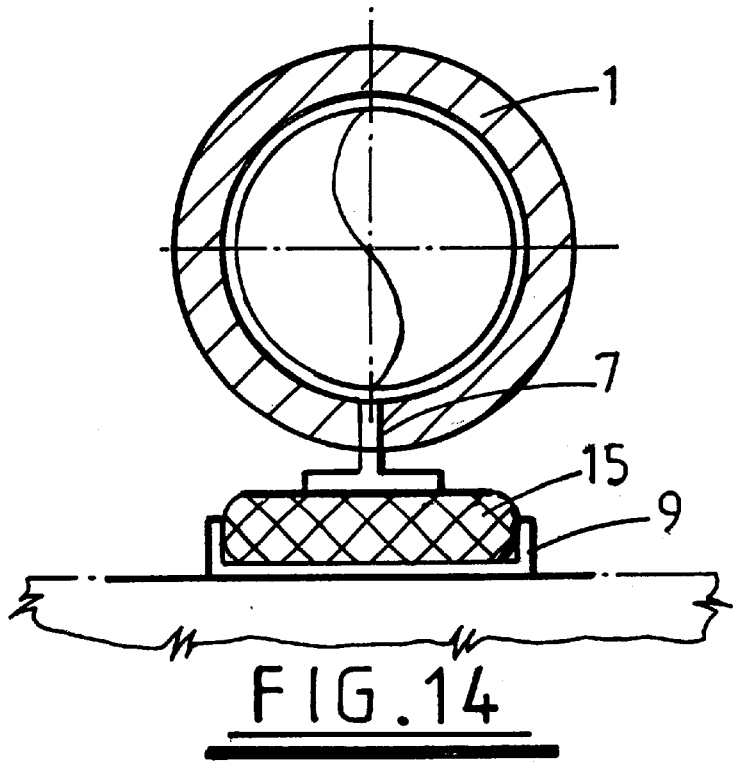
Figure 15:
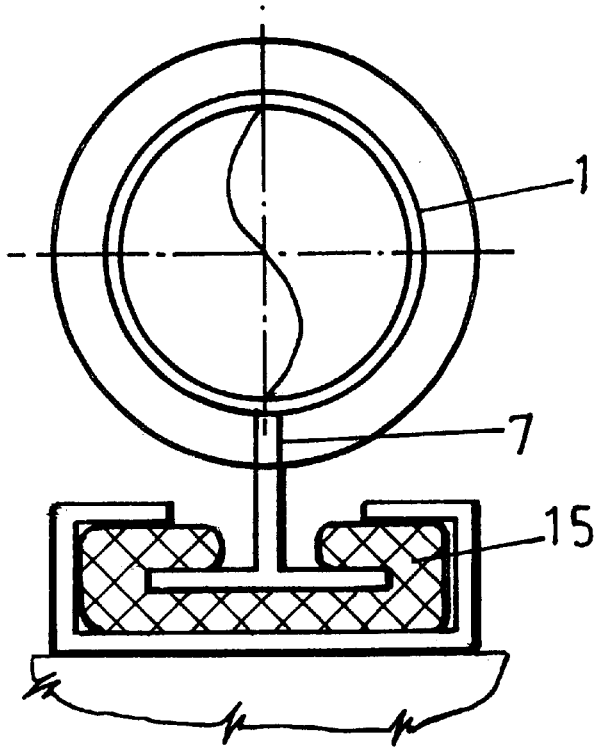

FIGS. 12, 13, 14 and 15 show other uses of bags 15 in supporting pipes 1. In FIG. 12, the bag 15 is contained in a base tray 9 mounted on a structure. In FIG. 13, a banding strap 8 holds down the pipe 1. FIG. 14 has the pipe 1 mounted on a shoe 7 that rests on the bag 15 and in FIG. 15 the bag 15 is folded over at its ends to enclose the base plate of the shoe 7.

Referring to FIG. 17 of the drawings, a drill conductor tube 110 of an offshore platform passes through a series of guide tubes 112, usually one at each jacket frame and deck level 114. A typical offshore platform will have many such conductor tubes, which run from the seabed to a wellhead area. As can be seen the guide tube 112 has an upper frusto-conical or flared section 116 converging to a lower cylindrical section 118. The conductor tube 110 is generally cylindrical. The frusto-conical section 116 facilitates the introduction of the conductor tube as it is passed through the guide tube.

Turning to FIGS. 18 to 22, in order to provide damping between the conductor tube and guide tube use is made of the annular space between them by inserting one or more bags 120 into the annular space and filling the bags with a settable polymer, such as polyurethane. The bag is made of PVC coated nylon fabric sections and has stitched or ultrasonically welded seams. The bag 120 has a main section 122 that is generally rectangular and of substantially even thickness. The intended top section 124 of the bag 120 is divergent in side view in order to provide a part of the bag to fill the space between the conductor tube and guide tube, where the guide tube has its frusto-conical section 116. The top section of the bag has a top wall 126 that has an aperture 128 for introduction of the settable polymer and a vent 132 for air to escape as it is displaced by the polymer (see FIG. 20). Along its lower edge 134, the bag 120 has an enlarged section to form a lip or bulge when the bag is filled.

Along its side edges the main section of the bag has open-ended pockets 136. The pockets 136 retain support rods 138 that have clamp hooks 140,142 at opposite ends thereof. The rods 138 are angled to match the profile of the guide tube 112. The rods 138 not only provide locations for the clamp hooks 140,142 but also help to ensure that the bag fits correctly within the annular gap between the conductor tube 110 and the guide tube 112.

To provide damping between a conductor tube 110 and a guide tube 112, usually four bags 120 will be inserted into the annular gap between them and spaced apart The spaces between the bags 120 may be used for insertion of temporary chocks to centralise the conductor tube 110. The clamp hooks 140,142 are fitted over top and bottom edges 144,146 respectively of the guide tube 112 and tightened to hold the bags in place. Then a settable material, such as a two part polyurethane mix is poured or injected into each of the bags to fill them and allowed to set to form a resilient slab 130.

FIG. 19 shows how a bag looks in section when the filling material has set and FIG. 21 shows a set bag removed from the annular gap.

The use of the bags shown in FIGS. 18 to 22 is suitable particularly for conductor/guide tube arrangements where the annular gap is upped about 50 mm. For arrangements where there is a wider gap bags 148 may be provided with a core 150, such as shown in FIG. 23. The core 150 will probably be inserted into a bag 148 during manufacture of the bag. The core 150 can be of a foamed or expanded plastics material, such as, for example, of expanded or foamed polystyrene. The use of a foamed material may result in voids 151 being formed in the core.

The core 150 has front and rear faces 156, 158 respectively that are curved to follow the curvatures of the conductor and guide tubes 160, 162 respectively. Near its top the rear face 156 diverges from the front face 158 to match the divergence of the top of the guide tube 162. At its bottom edge, the front face has a nib 164. Between the front and rear faces of the core are a series of passages 168 to permit the filling material to spread evenly within the bag 148.

The bag 148 differs slightly from the bag 120. It has a top wall 170, a bottom wall 172, a front wall 174 a rear wall 176 and sidewalls joining the front and rear walls. The rear wall 176 diverges from the front wall to provide upper and lower widening bag parts 181, 182 respectively to match the shape of the guide tube because the guide tube diverges not only at its upper end but also at its lower end. An anti-bellying strap 190 is provided internally of the bag between the bottom wall 172 and where the rear wall 176 begins to diverge to form the lower widening bag part.

The core 150 has a raised central top section 184 that provides a location for attachment of support bar 188 screwed thereto. The support bar 188 holds the bag in position while the settable material is being introduced and during curing. The core 150 is adhered to the bottom wall 172 of the bag.

The bags 148 are used in a similar manner to the bags 120 as illustrated in FIGS. 18 to 22. Typically four bags will be used as shown in FIG. 25 of the drawings. The bags are spaced around the annular gap between the conductor tube 160 and guide tube 162 leaving spaces between them where temporary chocks can be inserted to centralise the conductor tube before the filling material is introduced into the bags.

It will be appreciated that the invention may have applications not only in relation to fixed offshore platforms but in relation to other offshore installations, including, for example, jack-up rigs and floating installations, where it is desirable to damp lateral movement of an elongate member, such as a tubular member, relative to a guide surrounding the elongate member.

The bags illustrated and in accordance with the invention, once set, can provide damping against lateral movement of conductor tubes and shock absorption against shock loading on the conductor tubes. The transfer of bending moments into the guide tubes may be eliminated, as sufficient compression of the set material will inhibit moment transfer into the guide tubes. The use of bags with settable material also has the advantage of being able to accommodate irregularities in the shapes of the conductor and guide tubes, such as ovality thereof.

Other benefits of the invention may include the following.

1 A close fitting shim can be produced that is of the desired shape.

2 Simple to install requiring no specialist equipment or personnel. The bag is easier to install into the annular space than a rigid shim. Typical installation time may be about three hours.

3 No costly and time-consuming onshore manufacture of shims. Only the bags have to be manufactured onshore.

4 The mechanical properties of the settable material can be tailored to suit individual requirements.

5 The bags can be used in a splash zone, deck levels and in sub sea situations as they will protect the settable material during curing.

6 The finished shape of the shims restrains them within the guide tubes without the need for mechanical fixing.

7 Requires no site survey to establish clearances between conductor tubes and guide tubes.

8 No damage need be caused to coatings of either the conductor or guide tubes.

Modifications and improvements can be incorporated without departing from the scope of the invention.

What is claimed is:

1. A method of damping a conductor tube extending through a guide tube therefor in a substantially vertical arrangement comprising the steps of inserting between the conductor tube and the guide tube a plurality of bags and filling the bags with a settable material to provide a resilient support between the conductor tube and the guide tube, wherein the bags are so sized as to extend below the guide tube and lower ends of the bags are shaped to form lips along said lower ends that extend outwardly of the guide tube.

2. A method as claimed in claim 1, wherein the guide tube has an upper outwardly flared portion and a lower cylindrical portion and upper ends of the bags are shaped to form a flared portion matching the upper outwardly flared portion of the guide tube.

3. A method as claimed in claim 2, wherein spaces between adjacent bags are used to insert temporary chocks between the conductor tube and its guide tube in order to centralise the conductor while the material introduced into the bags sets.

4. A method as claimed in claim 1, wherein the bags are made of a material that is substantially impervious to the settable material.

5. A method as claimed in claim 4, wherein the bags are made of synthetic fabrics.

6. A method as claimed in claim 5, wherein the synthetic fabric is coated with synthetic material.

7. A method as claimed in claim 5, wherein the bags are made of reinforced nylon coated with PVC.

8. A method as claimed in claim 1, wherein the bags are capable of withstanding pressures of at least 2 bar.

9. A method as claimed in claim 1, wherein the bags are made by joining appropriately shaped sections of fabric.

10. A method as claimed in claim 1, wherein the settable material is a synthetic material that can be poured, injected or pumped into a bag and then set to provide a resilient slab.

11. A method as claimed in claim 10, wherein the settable material when set is resistant to chemicals and to seawater.

12. A method as claimed in claim 1, wherein the settable material is polyurethane.

13. A method as claimed in claim 1, wherein at least one of the plurality of bags is partitioned whereby different filling materials may be used in different sections of the bag.

14. A method as claimed in claim 13, wherein a bulking material is used to form a core with more or less resilient material used in outer sections of the bag to provide the requisite damping effect.

15. A method as claimed in claim 1, wherein the bag has a filling port and a vent to allow displacement of air as the bag is filled.

16. A method as claimed in claim 1, wherein the bags have on their surfaces that contact the conductor tube a layer or coating of a friction reducing material to enable the conductor to move axially with minimal or no displacement of the bag.

17. A method as claimed in claim 1, wherein at least one of the plurality of bags includes a core.

18. A method as claimed in claim 17, wherein the core is a solid.

19. A method as claimed in claim 17, wherein the core has passages therethrough to allow flow of settable material through the core for even spread of settable material around the core and to help fix the core.

20. A method as claimed in claim 17, wherein the core is made of synthetic material.

21. A method as claimed in claim 20, wherein the core is made from a foamed or expanded material.

22. A method as claimed in claim 21, wherein the core is made of polystyrene.

23. A method as claimed in claim 17, wherein the core is fixed to a bottom wall of the bag.

24. A method as claimed in claim 17, wherein the core includes voids to alter damping characteristics.

25. A method as claimed in claim 1, wherein the bags have means for locating same prior to filling.

26. A method as claimed in claim 25, wherein the bags have one or more hooks or clamps to locate over a top edge of the guide tube.

27. A method as claimed in claim 1, wherein the bags have stiffening rods attached along sides of the bags.

28. A damping device for use between a conductor tube and a guide tube therefor in a substantially vertical arrangement comprising a bag adapted and shaped for insertion between a conductor tube and its guide tube and adapted to be filled by a settable material to provide a resilient support between the conductor tube and the guide tube, wherein the bag is so sized as to extend below the guide tube and a lower end of the bag is shaped to form a lip along said lower end that extends outwardly of the guide tube.

29. A damping device as claimed in claim 28, wherein the bag is sized so as to extend only over a portion of the periphery of a conductor tube.

30. A damping device as claimed in claim 28, wherein the bag is made of a material that is substantially impervious to the settable material.

31. A damping device as claimed in claim 30, wherein the bag is made of synthetic fabrics.

32. A damping device as claimed in claim 31, wherein the synthetic fabric is coated with synthetic material.

33. A damping device as claimed in claim 31, wherein the bag is made of reinforced nylon coated with PVC.

34. A damping device as claimed in claim 28, wherein the bag is capable of withstanding pressures of at least 2 bar.

35. A damping device as claimed in claim 28, wherein the bag is made by joining appropriately shaped sections of fabric, by stitching and/or ultrasonic welding.

36. A damping device as claimed in claim 28, wherein the settable material is a synthetic material that can be poured, injected or pumped into a bag and then set to provide a resilient slab.

37. A damping device as claimed in claim 36, wherein the settable material when set is resistant to chemicals and to seawater.

38. A damping device as claimed in claim 28, wherein the settable material is polyurethane.

39. A damping device as claimed in claim 28, wherein the bag is partitioned, whereby different filling materials may be used in different sections of the bag.

40. A damping device as claimed in claim 28, wherein the bag has a filling port and a vent to allow displacement of air as the bag is filled.

41. A damping device as claimed in claim 28, wherein the bag has upper and lower parts that when expanded correspond with the cross-sectional shape of the annular gap between a cylindrical conductor tube and its guide tube.

42. A damping device as claimed in claim 28, wherein the bags are sized so as to extend below the guide tube and the lower ends of the bags are shaped so as to expand to form a lip or bulge along their bottom edge that extends outwardly of the guide tube.

43. A damping device as claimed in claim 28, wherein the bags have on their surfaces that contact the conductor tube a layer or coating of a friction reducing material to enable the conductor to move axially with minimal or no displacement of the bag.

44. A damping device as claimed in claim 28, wherein bag includes a core.

45. A damping device as claimed in claim 44, wherein the core is a solid.

46. A damping device as claimed in claim 45, wherein the core has passages therethrough to allow flow of settable material through the core for even spread of settable material around the core and to help fix the core.

47. A damping device as claimed in claim 44, wherein the core is made of synthetic material.

48. A damping device as claimed in claim 47, wherein the core is made from a foamed or expanded material.

49. A damping device as claimed in claim 48, wherein the core is made of polystyrene.

50. A damping device as claimed in claim 44, wherein the core is fixed to a bottom wall of the bag.

51. A damping device as claimed in claim 44, wherein the core includes voids to alter damping characteristics.

52. A damping device as claimed in claim 28, wherein the bag includes void pockets.

53. A damping device as claimed in claim 28, wherein the bag has means for locating same prior to filling.

54. A damping device as claimed in claim 53, wherein the bag has one or more hooks or clamps to locate over a top edge of the guide tube.

55. A damping device as claimed in claim 28, wherein the bag has stiffening rods attached along sides thereof.

56. A damping device as claimed in claim 28, wherein the guide tube has an upper outwardly flared portion and a lower cylindrical portion and wherein upper ends of the bags are shaped to form a flared portion matching the upper outwardly flared portion of the guide tube.

57. A method of damping a conductor tube extending through a guide tube therefor in a substantially vertical arrangement, the guide tube having an upper outwardly flared portion and a lower cylindrical portion, the method comprising the steps of inserting between the conductor tube and the guide tube a plurality of bags and filling the bags with settable material to provide a resilient support between the conductor tube and the guide tube, wherein the bags are so sized as extend below the guide tube and lower ends of the bags are shaped to form lips along said lower ends that extend outwardly of the guide tube, and wherein upper ends of the bags are shaped to form a flared portion matching the upper outwardly flared portion of the guide tube.

58. A damping device for a conductor tube extending through a guide tube therefor in a substantially vertical arrangement, the guide tube having an upper outwardly flared portion and a lower cylindrical portion, comprising a bag adapted and shaped for insertion between the conductor tube and its guide tube and adapted to be filled by a settable material to provide a resilient support between the conductor tube and the guide tube, wherein the bag is so sized as to extend below the guide tube and a lower end of the bag is shaped to form a lip along said lower end that extends outwardly of the guide tube, and wherein an upper end of the bag is shaped to form a flared portion matching the upper outwardly flared portion of the guide tube.

* * * * *